United States Patent
Fujibayashi

(10) Patent No.: US 7,879,506 B2
(45) Date of Patent: Feb. 1, 2011

(54) SOLID POLYMER ELECTROLYTE MEMBRANE, METHOD FOR MANUFACTURING THE SAME, AND FUEL CELL USING THE SOLID POLYMER ELECTROLYTE MEMBRANE

(75) Inventor: Fusaki Fujibayashi, Kanagawa (JP)

(73) Assignee: Samsung SDI Co., Ltd., Suwon (KR)

( * ) Notice: Subject to any disclaimer, the term of this patent is extended or adjusted under 35 U.S.C. 154(b) by 988 days.

(21) Appl. No.: 11/272,642

(22) Filed: Nov. 15, 2005

(65) Prior Publication Data

US 2006/0105217 A1 May 18, 2006

(30) Foreign Application Priority Data

Nov. 16, 2004 (JP) .............................. 2004-331656
Mar. 21, 2005 (KR) ...................... 10-2005-0023240

(51) Int. Cl.
 *H01M 8/10* (2006.01)
(52) U.S. Cl. ..................................................... 429/492
(58) Field of Classification Search .................... 429/33
 See application file for complete search history.

(56) References Cited

U.S. PATENT DOCUMENTS

| 3,313,783 | A | | 4/1967 | Iwakura et al. |
| 3,509,108 | A | | 4/1970 | Prince |
| 3,555,389 | A | | 1/1971 | Opal |
| 5,525,436 | A | * | 6/1996 | Savinell et al. ................. 429/30 |
| 5,798,188 | A | * | 8/1998 | Mukohyama et al. ......... 429/34 |
| 2005/0147859 | A1 | * | 7/2005 | Kiefer et al. ................... 429/33 |

FOREIGN PATENT DOCUMENTS

| JP | 06-111827 | | 4/1994 |
| JP | 2000-090946 | | 3/2000 |
| JP | 2001-035509 | | 2/2001 |
| JP | 2001-167629 | | 6/2001 |
| JP | 2001-213978 | | 8/2001 |
| JP | 2003-123791 | | 4/2003 |
| WO | WO 03075389 | * | 4/2003 |

* cited by examiner

*Primary Examiner*—Dah-Wei D Yuan
*Assistant Examiner*—Edu E Enin-Okut
(74) *Attorney, Agent, or Firm*—H.C. Park & Associates, PLC

(57) ABSTRACT

A solid polymer electrolyte membrane that exhibits stable energy generation performance for a long period of time at an operation temperature of about 100° C. to about 300° C. in an unhumidified condition or a relative humidity of about 50%. A method for manufacturing the solid polymer electrolyte membrane and a fuel cell that uses the solid polymer electrolyte membrane are provided. The solid polymer electrolyte membrane comprises a polymer compound that has a side chain that includes a unit represented by Formula (a) that is formed at a heterocyclic nitrogen atom of a polybenzimidazole.

4 Claims, 2 Drawing Sheets

SOLID POLYMER ELECTROLYTE MEMBRANE, METHOD FOR MANUFACTURING THE SAME, AND FUEL CELL USING THE SOLID POLYMER ELECTROLYTE MEMBRANE

CROSS-REFERENCE TO RELATED APPLICATIONS

This application claims priority to and the benefit of Japanese Patent Application No. 2004-331656, filed on Nov. 16, 2004, in the Japan Patent Office, and Korean Patent Application No. 10-2005-0023240, filed on Mar. 21, 2005, in the Korean Intellectual Property Office, the disclosures of which are incorporated herein in their entirety by reference.

BACKGROUND OF THE INVENTION

1. Field of the Invention

The present invention relates to a solid polymer electrolyte membrane, a method for manufacturing the same, and a fuel cell that includes the solid polymer electrolyte membrane.

2. Description of the Background

Ionic conductors through which ions can flow have been widely used as electrochemical devices such as fuel cells, electrochemical sensors, and the like.

Some types of fuel cells require proton conductors that can provide good proton conductivity for a long period of time at an operation temperature of about 100° C. to about 300° C. at no humidity or a relative humidity of 50% or less. A solid polymer fuel cell that uses an electrolyte membrane formed of a perfluorocarbonsulfonic acid does not have sufficiently high energy generation efficiency at an operation temperature of about 100° C. to about 300° C. with a relative humidity of 50% or less.

A fuel cell that uses an electrolyte membrane that includes a proton conductivity donor is disclosed in Japanese Patent Laid-Open Publication No. 2001-035509. A fuel cell that uses a silica-dispersed membrane is disclosed in Japanese Patent Laid-open Publication No. Hei 06-111827. A fuel cell that uses an inorganic-organic composite membrane is disclosed in Japanese Patent Laid-open Publication No. 2000-090946. A fuel cell that uses a phosphoric acid-doped graft membrane is disclosed in Japanese Patent Laid-open Publication No. 2001-213978. A fuel cell that uses an ionic liquid composite membrane is disclosed in Japanese Patent Laid-open n Publication Nos. 2001-167629 and 2003-123791.

In addition, U.S. Patent No. 5,525,436 discloses a solid polymer electrolyte membrane that includes polybenzimidazole doped with a strong acid such as phosphoric acid.

However, the fuel cells disclosed in Japanese Patent Laid-open Publication Nos. 2001-035509, 2000-090946, and 2001-213978, and Japanese Patent Laid-open Publication No. Hei 06-111827 cannot stably generate energy for a long period of time even at an operation temperature of about 100° C. to about 300° C. at no humidity or a relative humidity of 50% or less.

In addition, because phosphoric acid fuel cells, solid oxide fuel cells, and molten salt fuel cells have a very high operation temperature of 300° C., the components of the fuel cells have poor long-term stability.

U.S. Patent No. 5,525,436 describes a solid polymer fuel cell that exhibits comparatively high energy generation at high temperatures of up to about 200° C. However, the energy generation efficiency of the fuel cell cannot be stably maintained over a long period of time.

Thus, there exists a need for a fuel cell with improved energy generation performance, system efficiency, and long-term durability of the fuel cell components to stably maintain high energy generation efficiency over a long time period at an operation temperature of about 100° C. to about 300° C. at no humidity or a relative humidity of about 50% or less.

SUMMARY OF THE INVENTION

The present invention provides a solid polymer electrolyte membrane that exhibits stable energy generation performance over a long period of time at an operation temperature of about 100° C. to about 300° C. at no humidity or a relative humidity of about 50% or less.

The present invention also provides a method for manufacturing the solid polymer electrolyte membrane and a fuel cell that uses the solid polymer electrolyte membrane.

Additional features of the invention will be set forth in the description which follows, and in part will be apparent from the description, or may be learned by practice of the invention.

The present invention discloses a solid polymer electrolyte membrane comprising a polymer compound that has a side chain that includes a unit represented by Formula (a) that is formed at a heterocyclic nitrogen atom of a polybenzimidazole.

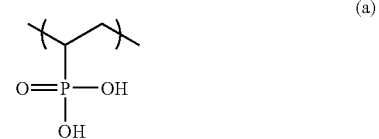

(a)

The invention also discloses a method for manufacturing a solid polymer electrolyte membrane comprising adding a substituent with a C-C double bond to a heterocyclic nitrogen atom of a polybenzimidazole with vinylphosphonic acid. The method further comprises performing addition polymerization to the vinylphosphonic acid.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE INVENTION

Figure 1:
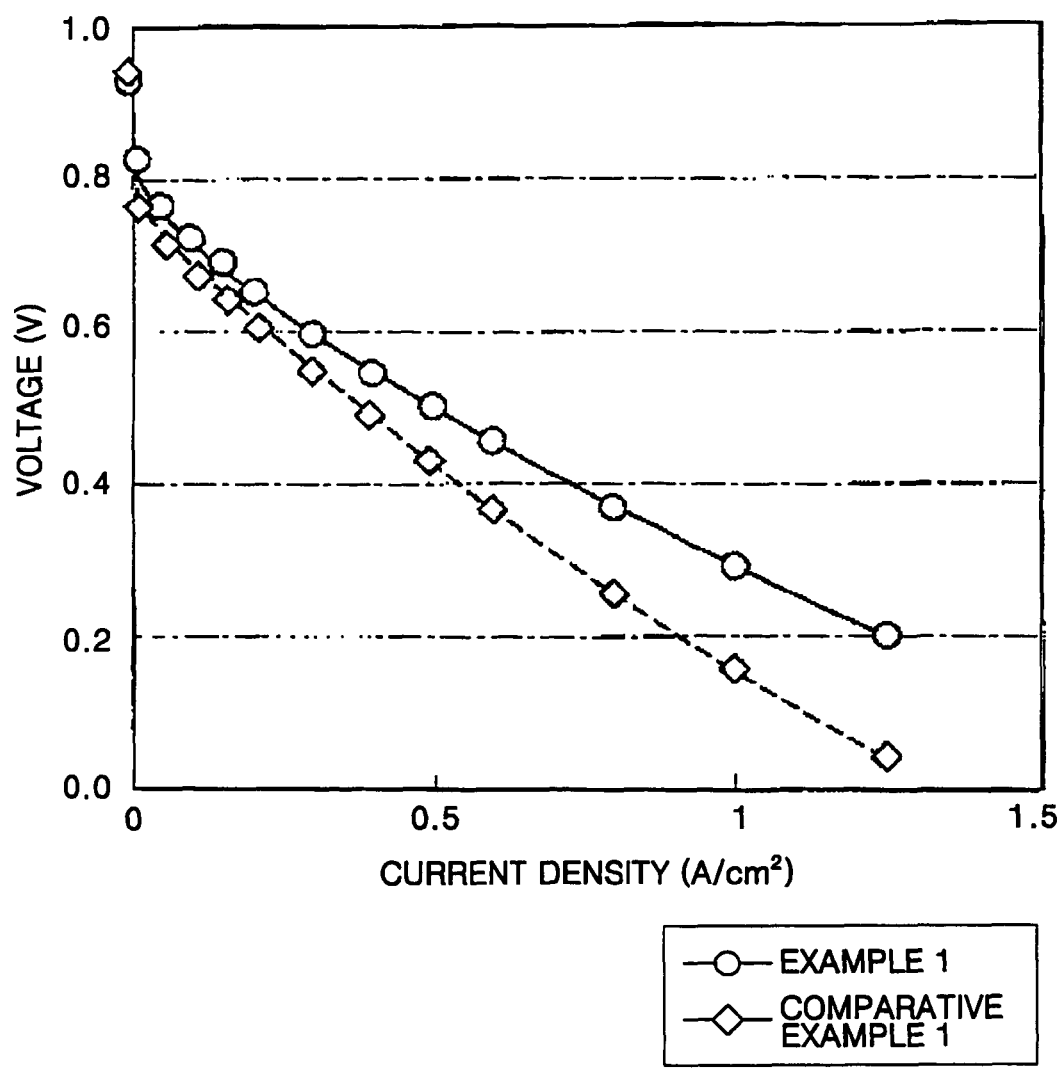
FIG. 1 is a graph of voltage with respect to current density of fuel cells of Example 1 and Comparative Example 1 at an initial operation stage.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

A solid polymer electrolyte membrane of the present invention exhibits stable energy generation performance over a long period of time at an operation temperature of about 100° C. to about 300° C. at no humidity or a relative humidity of about 50% or less. In addition, a fuel cell may be fabricated using the solid polymer electrolyte membrane.

A solid polymer electrolyte membrane of the present invention comprises a polymer compound that has a side chain that includes a unit represented by Formula (a) below that is positioned at a heterocyclic nitrogen of a polybenzimidazole. The concentration of the polymer compound included in the solid polymer electrolyte membrane may be about 80 wt % or greater, about 90 wt % or greater, about 100 wt %, or between about 80 to about 100 wt % of the solid polymer electrolyte membrane. In addition, the polymer compound may include a small concentration of a compound, such as a vinylphosphonic acid or the like, which is inert during the preparation of the compound.

The side chain in the polymer compound may comprise more than one unit of Formula (a). For example, each side chain may include up to about 20 units of Formula (a), but the number of units of Formula (a) is not limited thereto. When the Formula (a) unit is positioned at an end of the side chain, a hydrogen atom is bound to the end of the side chain.

A method for manufacturing a solid polymer electrolyte membrane according to the present invention may include adding a substituent with a C-C double bond to a heterocyclic nitrogen atom of a polybenzimidazole, polymer 1, to obtain a polymer compound, polymer 2. Polymer 2 is then doped with vinylphosphonic acid and subjected to addition polymerization of the vinylphosphonic acid to the C-C double bond. This results in a polymer compound, polymer 3, which has a side chain including a Formula (a) unit at the heterocyclic nitrogen atom of the polybenzimidazole.

Polymer 1 may include polymers represented by Formulas (b-1), (b-2) and (b-3) and derivatives thereof, but is not limited thereto.

(b-1)

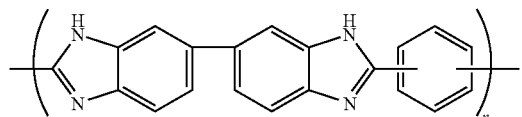

(b-2)

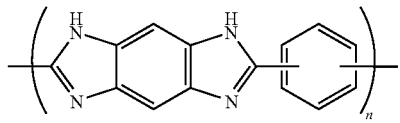

(b-3)

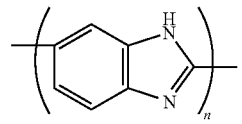

These polymers may have excellent thermal resistance and include a large amount of acid, and are thus suitable as a constituent of a solid polymer electrolyte membrane for fuel cells.

In Formulas (b-1), (b-2), and (b-3), n is in the range of about 10 to about 100,000.

When n is about 10 or greater, the polymer or derivatives thereof are stable. When n is about 100,000 or less, the polymer may be easily dissolved in an organic solvent, for example, and is thus suitable to form a solid polymer electrolyte membrane. However, when n is less than about 10, it is difficult to form the electrolyte membrane.

The polymers may be prepared using commonly known techniques such as those disclosed in U.S. Pat. Nos. 3,313,783, 3,509,108, and 3,555,389, for example.

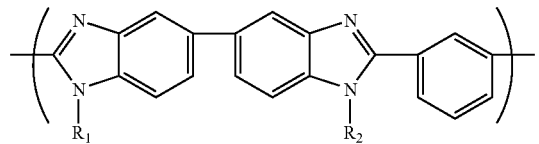

Polymer 1 may be a single compound or a mixture of two or more compounds.

Polymer 2 is a polymer compound in which a substitutent with a C-C double bond is bonded to the heterocyclic nitrogen atom of polymer 1. Polymer 2 may be obtained by adding the substituent to polymer 1.

Polymer 2 may also be obtained by substituting an active hydrogen bonded to the heterocyclic nitrogen atom of any of the units represented by Formulas (b-1), (b-2), and (b-3) with the substituent with a C-C double bond, for example. When the polybenzimidazole (polymer 1) comprising the unit represented by Formula (b-1) is used, polymer 2 may have a structure represented by Formula (c).

(c)

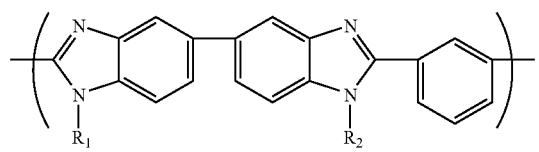

In Formula (c), $R_1$ and $R_2$ may each be a substituent with a C-C double bond or a hydrogen atom, and at least one of $R_1$ and $R_2$ is a substituent with a C-C double bond.

There may be one C-C double bond in the substituent, for example. In addition, the location of the C-C double bond in the substituent is not limited and the C-C double bond may be located at an end of the substituent:

In addition, the substituent may have any structure as long as it has a C-C double bond. An exemplary substituent may have a chain structure that has no cyclic group, such as a linear or a branched structure. The substituent may also be a hydrocarbon group with an ether bond or a carbonyl group inserted in the C-C bond.

Polymer 2 may be obtained by reacting polymer 1 with a molecule that includes an isocyanate group or a glycidyl group and a C-C double bond, as illustrated in Reaction Scheme 1 and Reaction Scheme 2 below.

Reaction Scheme 1

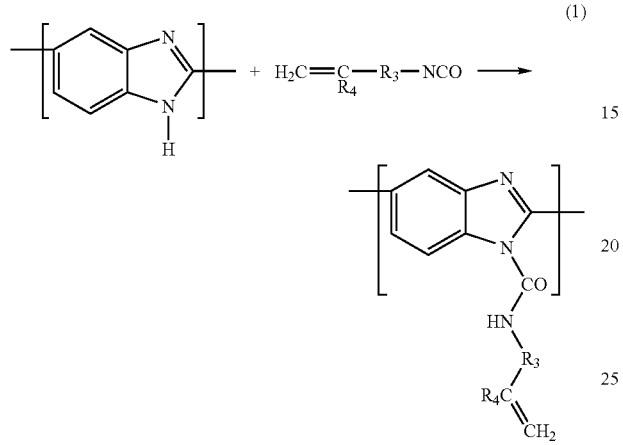

(1)

In Reaction Scheme 1, $R_3$ may be a bivalent organic group and $R_4$ may be a hydrogen atom or a monovalent organic group.

Reaction Scheme 2

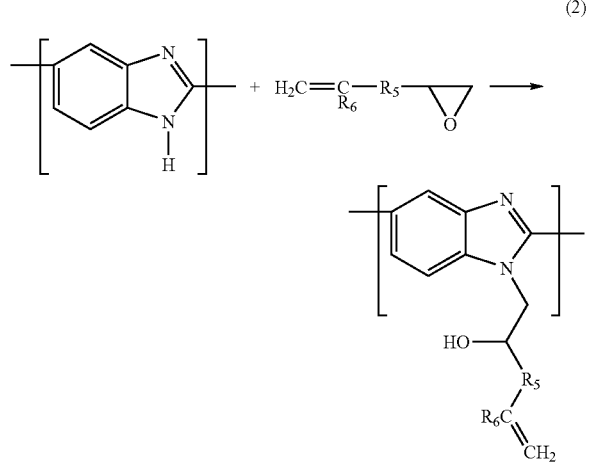

(2)

In Reaction Scheme 2, $R_5$ may be a bivalent organic group and $R_6$ may be a hydrogen atom or a monovalent organic group.

The molecule with a substituent to be added may include any structure as long as it includes the substituent, which is an essential functional group, in its molecular structure.

For example, in the molecule with a substituent to be added in Reaction Scheme 1, $R_3$ may be a bivalent organic group with a linear or branched chain structure. In addition, $R_3$ may be a hydrocarbon group with an ether bond or a carbonyl group inserted in the C-C bond. The hydrocarbon group may be saturated. In addition, the number of carbons in the hydrocarbon group may be in the range of about 1 to about 5.

In addition, $R_4$ may be a hydrogen atom or a monovalent organic group, which may be an alkyl group including, for example, about 1 to about 3 carbon atoms.

In the molecule with a substituent to be added in Reaction Scheme 2, $R_5$ may be the same as $R_3$, and $R_6$ may be the same as $R_4$.

Considering reactivity with a polybenzimidazole and its durability, the molecule with a substituent to be added may be at least one of 2-isocyanatoethylmethacrylate represented by Formula (c-1), 2-isocyanatoethylacrylate represented by Formula (c-2), and glycidylmethacrylate represented by Formula (c-3).

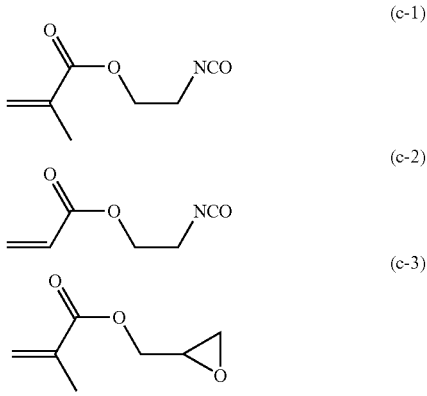

(c-1)

(c-2)

(c-3)

Various methods may be used to react polymer 1 with the molecule with the substituent to be added to obtain polymer 2. For example, while the solvent in a solution of polymer 1 is removed by heating during a process for forming an electrolyte membrane, the reaction illustrated Reaction Scheme 1 or Reaction Scheme 2 may be induced.

The ratio of nitrogen-containing heterocyclic active hydrogen in polymer 1 that will be substituted with the substituent is not limited. However, 20% or more, preferably 50% or more, and 100% or less of nitrogen-containing heterocyclic active hydrogen in polymer 1 may be substituted.

The substitution ratio of the nitrogen-containing heterocyclic active hydrogen may be calculated based on the concentrations of the reactants in the reactions illustrated in Reaction Scheme 1 or Reaction Scheme 2 since the reaction occurs on an equivalent basis.

Polymer 3 is a polymer compound that has a side chain including the unit represented by Formula (a) at the heterocyclic nitrogen atom of polymer 1. For example, polymer 3 may be obtained by doping polymer 2 with the vinylphosphonic acid represented by Formula (a-0) and performing addition polymerization to add the vinylphosphonic acid to a C-C double bond in the substituent in polymer 2. As a result, at least one vinylphosphonic acid is added to the C-C double bond so that the unit of Formula (a) is added to the side chain of polymer 2.

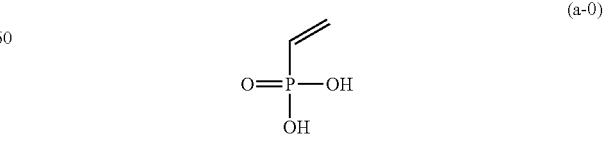

(a-0)

A method for addition polymerization using the vinylphosphonic acid is not limited, and may be a conventional polymerization method in which a polymer is obtained by addition-polymerizing vinyl group-containing monomers.

In particular, thermal polymerization in which radical species generated by heat are polymerized, initiator polymerization in which radical species that are generated by decomposing peroxide are used as an initiator, photopolymerization in which radical species generated by light irradiation, and radioactive ray polymerization in which radical species generated by radioactive ray irradiation, etc., may be used.

The concentration of Formula (a) units in each repeating unit of polymer 1 may be in the range of about 20 mol % to about 2,000 mol %, or about 50 mol % to about 1,500 mol %.

For example, 20 mol % of the Formula (a) unit means that one repetition unit of polymer 1 contains 0.2 units of Formula (a), and 2,000 mol % of the unit of Formula (a) means that one repetition unit of polymer 1 contains 20 units of Formula (a). When the concentration of the vinylphophonic acid is about 20 mol % or greater, the energy generation performance of a fuel cell is relatively high. When the concentration of the vinylphophonic acid is about 2,000 mol % or less, the performance of a fuel cell may be maintained for a long period of time without the leakage of acid. In addition, the thermal resistance and the chemical stability of the fuel cell improve.

In addition, using the resulting polymer compound, i.e., polymer 3, a solid polymer electrolyte membrane with excellent characteristics may be formed according to a conventional method. For example, a solution mixture of polymer 1 and the molecule with the is substituent to be added is coated on a glass plate, etc., and reacted while heating to obtain polymer 2, which has a bar shape. Polymer 2 was treated with vinylphosphonic acid to produce polymer 3, which is used to manufacture a solid polymer electrolyte membrane.

A fuel cell according to the present invention may be fabricated using the solid polymer electrolyte membrane prepared according to the above-described processes. The solid polymer electrolyte membrane is interposed between an oxide electrode and a fuel electrode. An oxidant bipolar plate including an oxidant channel is arranged on a side of the oxygen electrode, and a fuel bipolar plate including a fuel channel is arranged on a side of the fuel electrode to form a unit cell. A solid polymer fuel cell is fabricated using multiple unit cells.

The solid polymer fuel cell may generate energy stably for a long period of time even at an operation temperature of about 100° C. to about 300° C. at no humidity or a relative humidity of 50% or less. The solid polymer fuel cell may be useful in cars, domestic power generating systems, and the like.

Although the reason for the improved characteristics of the fuel cell of the present invention is unclear, the long-term energy generation performance stability may be the result of the use of the polymer compound (polymer 3) that has a side chain with the unit of Formula (a). The side chain with proton conductivity may be stably retained in the electrolyte membrane for a longer term than an electrolyte membrane comprising polybenzimidazole that is doped with a phosphoric compound.

EXAMPLES

The present invention will be described in detail with reference to Example 1, Example 2, and Comparative Example 1 in which solid polymer electrolyte membranes were fabricated. The concentration of vinylphosphonic acid doped in each of the solid polymer electrolyte membranes was measured. In addition, the energy generation characteristics of fuel cells (at an initial stage and over time) fabricated using the solid polymer electrolyte membranes were evaluated.

Each of the fuel cells was fabricated using a membrane-electrode assembly that was prepared by interposing one of the electrolyte membranes between commercially available fuel cell electrodes (Electrochemist Inc.). The fuel cells were operated at 150° C. at no humidity while supplying hydrogen and air. The area of each of the electrodes was (3 cm×3 cm) 9 $cm^2$, and hydrogen was supplied at a rate of 50 mL/min while air was supplied at a rate of 100 mL/min.

Example 1

10 wt % of poly-2,2'-(m-phenylene)-5,5'-bibenzimidazole (weight average molecular weight of 150,000 on a polystyrene basis) as a polybenzimidazole was dissolved in N,N-dimethylacetamide. One equivalent of 2-isocyanatoethylmethacrylate (Carlenz MOI®, Showha Electric, Japan) with respect to the nitrogen-containing heterocyclic active hydrogen of the polybenzimidazole was added to the solution.

The resulting solution was spread on a glass plate using a doctor blade and then heated at 150° C. to remove the solvent from the solution and induce the reaction illustrated in Reaction Scheme 1. The result was a polymer compound film in which the substituent with a C-C double bond was bonded to the heterocyclic nitrogen atom of the polybenzimidazole.

Then, the polymer compound film was directly immersed in vinylphosphonic acid (Tokyo Chemicals Inc.) at 70° C. after 1,000 ppm of organic peroxide, 2,5-dimethyl-2,5-bis(t-butylperoxy) hexane (Perhexer 25B®, Nippon Oil & Fat), was added. The mixture of the vinylphosphonic acid and the organic peroxide was left for 2 hours on the polymer compound film to dope the film.

The resulting polymer compound film was heated at 170° C. for 2 minutes to induce radical polymerization between the vinylphosphonic acid and the C-C double bond in the substituent added to the heterocylic nitrogen atom of poly-2,2'-(m-phenylene)-5,5'-bibenzimidazole. 2,5-dimethyl-2,5-bis (t-butyloxy)hexane was used as an initiator to form a solid polymer electrolyte membrane.

The amount of the vinylphosphonic acid added in the polymer electrolyte membrane was calculated from the difference between the weight of the solid polymer electrolyte membrane after the radical polymerization and the weight of the solid polymer electrolyte membrane after being washed with water at 100° C. for 2 hours to remove the non-reacted vinylphosphonic acid and dried in a vacuum at 120° C. for 2 hours. The vacuum drying was performed to eliminate the effect of adsorbed moisture. As a result, the added concentration of the vinylphosphonic acid was found to be 500 mol % per repeating unit of poly-2,2'-(m-phenylene)-5,5'-bibenzimidazole.

A fuel cell was fabricated using the solid polymer electrolyte membrane that was prepared according to the method described above. The energy generation characteristics of the fuel cell were evaluated.

Example 2

A polymer compound film was fabricated in the same manner as in Example 1 except that glycidylmethacrylate (Tokyo Chemicals Inc.) was used instead of 2-isocyanatoethylmethacrylate to induce the reaction illustrated in Reaction Scheme 2.

Vinylphosphonic acid was added to the polymer compound film in the same manner as in Example 1, to prepare the solid polymer electrolyte membrane of Example 2 with a concentration of 450 mol % of vinylphosphonic acid.

A fuel cell was fabricated using the solid polymer electrolyte membrane, and the emergy generation characteristics of the fuel cell were measured in the same manner as in Example 1.

Comparative Example 1

Poly-2,2'-(m-phenylene)-5,5'-bibenzimidazole (weight average molecular weight of 150,000 on a polystyrene basis) was doped with 600 mol % of a phosphoric acid to obtain a solid polymer electrolyte membrane.

A fuel cell was fabricated using the solid polymer electrolyte membrane, and the energy generation characteristics of the fuel cell were measured in the same manner as in Example 1.

The open circuit voltages and the output voltages at a current density of 0.3 A/cm² of the fuel cell at an initial stage and after 200 hours of operation are shown in Table 1.

Figure 2:
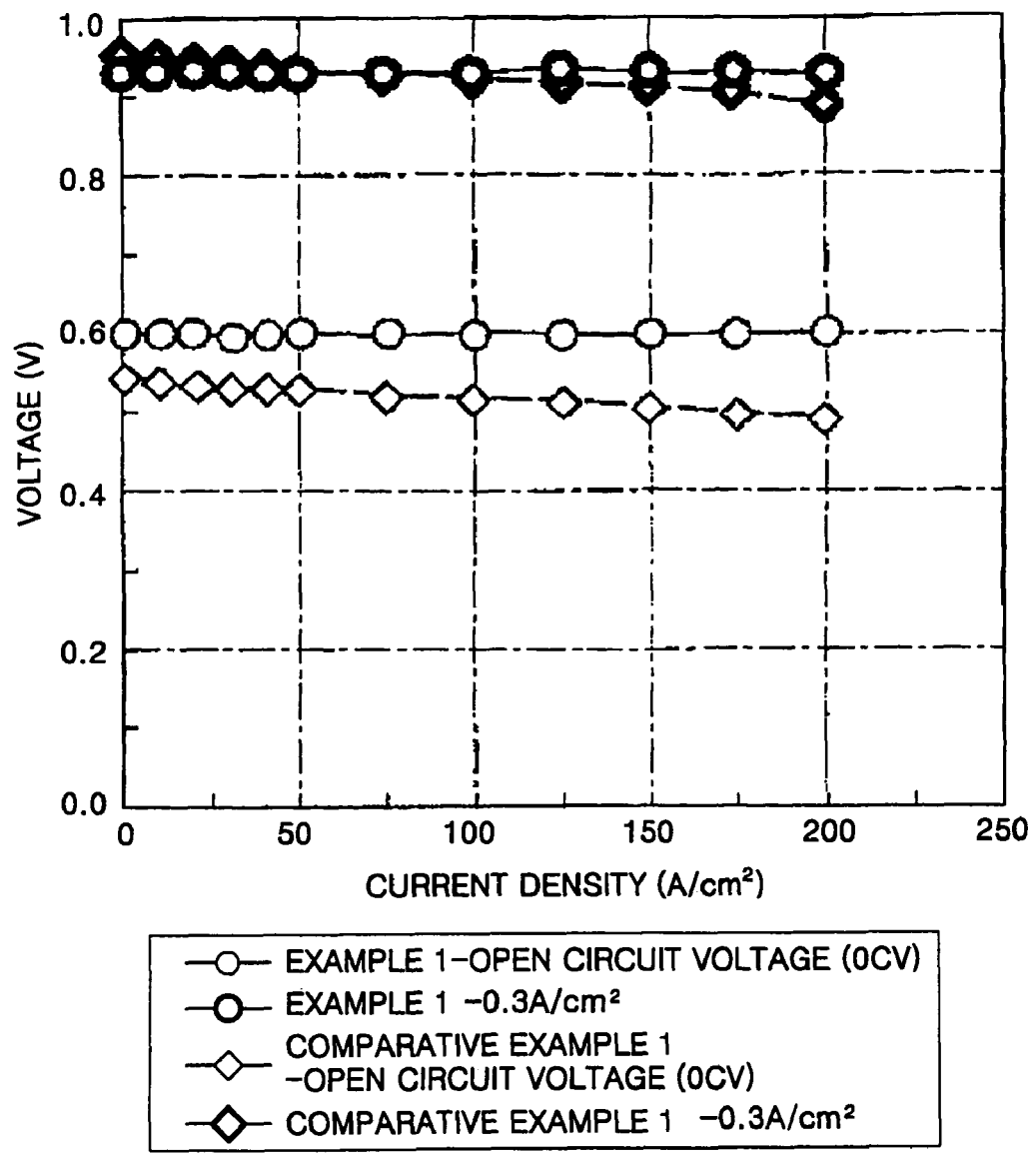
FIG. 2 is a graph of open circuit voltage and output voltage at a current density of 0.3 A/cm$^2$ with respect to operation time of the fuel cells of Example 1 and Comparative Example 1.

FIG. 1 is a graph of voltage versus current density at an initial energy generation stage. FIG. 2 is a graph of open circuit voltage and output voltage at a current density of 0.3 A/cm² with respect to time.

TABLE 1

| | | Example 1 | Example 2 | Comparative Example 1 |
|---|---|---|---|---|
| Initial stage | Open circuit voltage (V) | 0.933 | 0.930 | 0.951 |
| | Voltage (0.3 A/cm²) | 0.602 | 0.582 | 0.546 |
| After 200 hours | Open circuit voltage (V) | 0.923 | 0.913 | 0.888 |
| | Drop in open circuit voltage (%) | 1.1 | 1.8 | 6.6 |
| | Voltage (0.3 A/cm²) | 0.595 | 0.575 | 0.488 |
| | Drop in voltage (0.3 A/cm²) (%) | 1.2 | 1.2 | 10.6 |

Table 1 shows the open circuit voltages and the output voltages at a current density of 0.3 A/cm² of the fuel cells fabricated using the solid polymer electrolyte membranes of Example 1, Example 2, and Comparative Example 1 at an initial energy generation stage and after 200 hours of operation. In Table 1, a drop in voltage after 200 hours of operation is represented as a percentage of the initial voltage.

As shown in Table 1, at the initial stage, there are no large differences in open circuit voltage and output voltage at a current density of 0.3 A/cm² between the fuel cells of Example 1, Example 2, and Comparative Example 1.

However, after 200 hours of operation, the open circuit voltage and the output voltage (at a current density of 0.3 A/cm²) of the fuel cell of Comparative Example 1 were greatly reduced compared to the fuel cells of Example 1 and Example 2.

FIG. 1 is a graph of voltage versus current density of the fuel cells of Example 1 and Comparative Example 1 at an initial stage. There was no significant difference in voltage between the fuel cells at an initial stage even when the current density is high.

FIG. 2 is a graph of open circuit voltage (OCV) and output (cell) voltage at a current density of 0.3 A/cm² with respect to operation time of the fuel cells of Example 1 and Comparative Example 1. Referring to FIG. 2, both the open circuit voltage and the output voltage of the fuel cell of Comparative Example 1 dropped as the operation time increases. However, there was no drop in voltage of the fuel cell of Example 1.

As described above, the fuel cells of Example 1 and Example 2 have good durability and can stably maintain the energy generation performance for a long period of time at 150° C. in an unhumidified condition compared to the fuel cell of Comparative Example 1.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A solid polymer electrolyte membrane, comprising: a polymer compound, with a side chain including a unit represented by Formula (a), positioned at a heterocyclic nitrogen atom of a polybenzimidazole,

wherein the concentration of the unit represented by Formula (a) is about 20 mol % to about 2000 mol % per repeated unit of the polybenzimidazole, and the polymer compound is obtained by reacting a polymer 2 with vinyl phosphonic acid represented by formula (a-0), and the polymer 2 is obtained by reacting the polybenzimidazole with a molecule that includes an isocyanate group or a glycidyl group and a C—C double bond

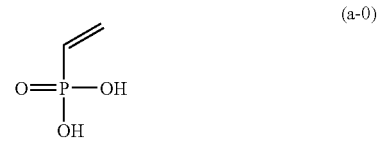

wherein said molecule that includes an isocyanate group or a glycidyl group and a C—C double bond is at least one of 2-isocyanatoethylmethacrylate represented by formula (c-1), 2-isocyanatoethylacrylate represented by formula (c-2), and glycidylmethacrylate represented by formula (c-3)

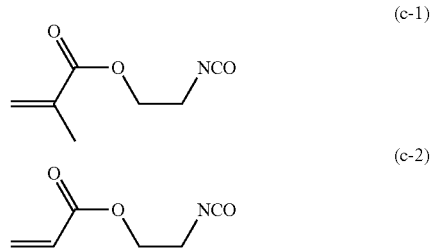

-continued

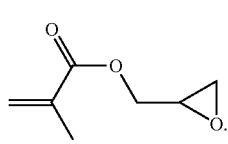
(c-3)

2. A fuel cell, comprising:
a unit cell, comprising
an oxygen electrode;
a fuel electrode; and
the solid polymer electrolyte membrane of claim 1 interposed between the oxygen electrode and the fuel electrode,
wherein an oxidant bipolar plate with an oxidant channel is arranged on a side of the oxygen electrode and a fuel bipolar plate with a fuel channel is arranged on a side of the fuel electrode.

3. The solid polymer electrolyte membrane of claim 1, wherein the concentration of the unit represented by Formula (a) is about 50 mol % to about 1500 mol % per repeated unit of the polybenzimidazole.

4. The solid polymer electrolyte membrane of claim 1, wherein the concentration of the unit represented by Formula (a) is about 450 mol % to about 500 mol % per repeated unit of the polybenzimidazole.

* * * * *